United States Patent
Xu et al.

(10) Patent No.: US 10,116,144 B2
(45) Date of Patent: Oct. 30, 2018

(54) WIRELESS POWER TRANSFER APPARATUS USING ENCLOSURES WITH ENHANCED MAGNETIC FEATURES AND METHODS OF FABRICATING THE SAME

(71) Applicant: Eaton Capital Unlimited Company, Dublin 2 (IE)

(72) Inventors: Jun Xu, Shanghai (CN); Xiaojun Wang, Shanghai (CN); Yilei Gu, Shanghai (CN); Qinjie Zheng, Shanghai (CN); Bobby Leonard Compton, Raleigh, NC (US); Birger Pahl, Milwaukee, WI (US)

(73) Assignee: Eaton Intelligent Power Limited (IE)

( * ) Notice: Subject to any disclaimer, the term of this patent is extended or adjusted under 35 U.S.C. 154(b) by 543 days.

(21) Appl. No.: 14/719,603

(22) Filed: May 22, 2015

(65) Prior Publication Data
US 2016/0344195 A1 Nov. 24, 2016

(51) Int. Cl.
*H02J 5/00* (2016.01)
*H01F 38/14* (2006.01)
(Continued)

(52) U.S. Cl.
CPC .............. *H02J 5/005* (2013.01); *H01F 27/02* (2013.01); *H01F 27/24* (2013.01); *H01F 27/2823* (2013.01); *H01F 27/365* (2013.01); *H01F 38/14* (2013.01); *H01F 41/02* (2013.01); *H02J 50/10* (2016.02); *H02J 50/70* (2016.02)

(58) Field of Classification Search
CPC . H02J 5/005; H02J 50/10; H02J 50/70; H01F 27/365; H01F 27/24; H01F 38/14; H01F 27/2823; H01F 27/02; H01F 41/02
See application file for complete search history.

(56) References Cited

U.S. PATENT DOCUMENTS

| 2,568,169 A | 9/1951 | Raczynski |
| 3,484,727 A | 12/1969 | Weber et al. |
| (Continued) | | |

FOREIGN PATENT DOCUMENTS

| CN | 102 360 870 A | 2/2012 |
| CN | 102468741 | 5/2012 |
| (Continued) | | |

OTHER PUBLICATIONS

Braun Toothbrush Teardown, Published on May 29, 2012, EEVblog #284, Retrieved from the internet at URL https://www.youtube.com/watch?v=JJgKfTW53uo.
(Continued)

*Primary Examiner* — Jared Fureman
*Assistant Examiner* — Michael Warmflash
(74) *Attorney, Agent, or Firm* — Ward and Smith, P.A.

(57) ABSTRACT

An apparatus includes an enclosure and a coil assembly in the enclosure. The coil assembly includes a magnetic core and a coil disposed on the magnetic core. The magnetic core is positioned adjacent a wall of the enclosure such that a direction of a main flux path in the magnetic core is through at least one portion of the wall having a magnetic permeability greater than air. Such an arrangement may be used for a wireless power receiver unit configured to be installed in an equipment rack in data center applications.

22 Claims, 15 Drawing Sheets

(51) Int. Cl.
| | |
|---|---|
| H01F 27/28 | (2006.01) |
| H01F 41/02 | (2006.01) |
| H01F 27/24 | (2006.01) |
| H01F 27/02 | (2006.01) |
| H01F 27/36 | (2006.01) |
| H02J 50/10 | (2016.01) |
| H02J 50/70 | (2016.01) |

(56) References Cited

U.S. PATENT DOCUMENTS

| | | | |
|---|---|---|---|
| 4,471,335 A | 9/1984 | Moritz et al. | |
| 4,800,328 A * | 1/1989 | Bolger | B60L 5/005 |
| | | | 191/10 |
| 4,985,922 A * | 1/1991 | Kolbert | H04B 5/0093 |
| | | | 102/206 |
| 5,325,046 A | 6/1994 | Young et al. | |
| 5,477,122 A * | 12/1995 | Hall | B60L 11/182 |
| | | | 320/108 |
| 5,923,152 A | 7/1999 | Guerrera | |
| 6,060,875 A | 5/2000 | Capici et al. | |
| 6,198,375 B1 | 3/2001 | Shafer | |
| 6,957,351 B2 | 10/2005 | Emberty et al. | |
| 6,967,553 B2 * | 11/2005 | Jitaru | G11C 11/15 |
| | | | 336/178 |
| 7,411,479 B2 | 8/2008 | Baarman et al. | |
| 7,495,414 B2 | 2/2009 | Hui | |
| 7,554,430 B2 | 6/2009 | Mehrotra et al. | |
| 7,639,110 B2 | 12/2009 | Baarman et al. | |
| 8,089,766 B2 | 1/2012 | Attlesey | |
| 8,138,875 B2 | 3/2012 | Baarman et al. | |
| 8,380,998 B2 | 2/2013 | Azancot et al. | |
| 8,531,059 B2 | 9/2013 | Ichikawa et al. | |
| 8,669,678 B2 | 3/2014 | Urano | |
| 8,692,639 B2 | 4/2014 | Baarman et al. | |
| 8,698,350 B2 | 4/2014 | Kanno | |
| 9,705,567 B2 * | 7/2017 | Dean | G11B 33/08 |
| 9,859,594 B2 * | 1/2018 | Miller | H02J 50/12 |
| 2003/0201860 A1 * | 10/2003 | Yang | H01F 17/045 |
| | | | 336/65 |
| 2006/0049907 A1 | 3/2006 | Liu | |
| 2007/0007935 A1 | 1/2007 | Johnson | |
| 2008/0122543 A1 | 5/2008 | Silver et al. | |
| 2010/0314946 A1 * | 12/2010 | Budde | H02J 5/005 |
| | | | 307/104 |
| 2011/0049997 A1 | 3/2011 | Urano | |
| 2011/0080053 A1 | 4/2011 | Urano | |
| 2011/0127845 A1 * | 6/2011 | Walley | H02J 5/005 |
| | | | 307/104 |
| 2011/0127846 A1 | 6/2011 | Urano | |
| 2011/0163542 A1 | 7/2011 | Farkas | |
| 2011/0304216 A1 | 12/2011 | Baarman | |
| 2012/0043825 A1 | 2/2012 | Urano | |
| 2012/0086281 A1 | 4/2012 | Kanno | |
| 2012/0112719 A1 | 5/2012 | Xia et al. | |
| 2012/0193993 A1 | 8/2012 | Azancot et al. | |
| 2012/0200989 A1 * | 8/2012 | Byrne | H01R 13/447 |
| | | | 361/641 |
| 2012/0212068 A1 | 8/2012 | Urano | |
| 2012/0280575 A1 | 11/2012 | Kim et al. | |
| 2012/0293118 A1 * | 11/2012 | Kim | H02J 5/005 |
| | | | 320/108 |
| 2012/0294045 A1 | 11/2012 | Fornage et al. | |
| 2013/0033117 A1 | 2/2013 | Kim et al. | |
| 2013/0187625 A1 | 7/2013 | Mao | |
| 2013/0249304 A1 | 9/2013 | Keeling et al. | |
| 2013/0249479 A1 | 9/2013 | Partovi | |
| 2013/0300204 A1 | 11/2013 | Partovi | |
| 2014/0049118 A1 | 2/2014 | Karalis et al. | |
| 2014/0183967 A1 | 7/2014 | Ryu et al. | |
| 2014/0203657 A1 | 7/2014 | Song et al. | |
| 2014/0265613 A1 * | 9/2014 | Jaskolski | H02J 17/00 |
| | | | 307/104 |
| 2015/0091389 A1 * | 4/2015 | Byrne | H02J 5/005 |
| | | | 307/104 |
| 2015/0091522 A1 * | 4/2015 | Byrne | H02J 5/005 |
| | | | 320/108 |
| 2015/0280455 A1 | 10/2015 | Bosshard et al. | |
| 2016/0001662 A1 | 1/2016 | Miller et al. | |
| 2016/0181821 A1 * | 6/2016 | Xu | H01F 27/24 |
| | | | 307/104 |

FOREIGN PATENT DOCUMENTS

| | | |
|---|---|---|
| CN | 202309183 U | 7/2012 |
| CN | 202444333 U | 9/2012 |
| EP | 2 450 921 A1 | 5/2012 |
| EP | 2 458 600 A1 | 5/2012 |
| GB | 1134208 | 2/1966 |
| IN | 201203404 P4 | 2/2014 |
| JP | 2006-271027 A | 10/2006 |
| WO | WO 0225677 A2 | 3/2002 |
| WO | WO 2012/046453 A1 | 4/2012 |
| WO | WO 2013/009276 A1 | 1/2013 |
| WO | WO 2013/111243 A1 | 8/2013 |
| WO | WO 2014/122121 A1 | 8/2014 |

OTHER PUBLICATIONS

Duong et al. "Experimental Results of High-Efficiency Resonant Coupling Wireless Power Transfer Using a Variable Coupling Method", *IEEE Microwave and Wireless Components Letters*, vol. 21, No. 8, Aug. 2011, 3 pages.

International Preliminary Report on Patentability Corresponding to International Application No. PCT/US2014/072667; dated Jul. 14, 2016; 7 Pages.

International Search Report and Written Opinion Corresponding to International Application No. PCT/IB2015/055004; dated Sep. 15, 2015; 9 Pages.

International Search Report and Written Opinion Corresponding to International Application No. PCT/US2015/066406; dated Mar. 9, 2016; 11 Pages.

International Search Report and Written Opinion Corresponding to International Application No. PCT/US2016/031810; dated Jul. 20, 2016; 12 Pages.

Kelly et al. "Plastic-iron-powder distributed-air-gap magnetic material", 21st Annual IEEE Power Electronics Specialists Conference, Jun. 1990, pp. 25-34.

Nair et al. "Efficiency Enhanced Magnetic Resonance Wireless Power Transfer System and High Voltage Integrated Chip Power Recovery Scheme", *IEEE CONECCT 2014*, Jan. 6-7, 2014.

U.S. Appl. No. 14/143,505 entitled "Methods, Circuits and Articles of Manufacture for Configuring DC Output Filter Circuits" filed Dec. 30, 2013.

U.S. Appl. No. 14/323,436 entitled "Wireless Power Transfer Systems Using Load Feedback" filed Jul. 3, 2014.

International Search Report and Written Opinion Corresponding to International Application No. PCT/EP2015/080520; dated Jun. 30, 2016; 24 Pages.

Chen, Qingbin et al., "The New Electric Shielding Scheme with Comb-shaped Wire and its Applications in SMPS"; College of Electrical Engineering and Automation; Fuzhou University; Fuzhou, Fujian, 350108, China; Published in: Telecommunications Energy (INTELEC), 2011 IEEE 33rd International Conference; Oct. 9-13, 2011; ISSN: 2158-5210; 7 pages.

International Search Report and Written Opinion Corresponding to International Application No. PCT/US2014/072667; dated Mar. 25, 2015; 9 Pages.

Pang, Y.X. et al. (2007) "The influence of the dielectric on the properties of dielectromagnetic soft magnetic composites. Investigations with silica and silica hybrid sol-gel derived model dielectric", *Journal of Magnetism and Magnetic Materials*, 310 (1), pp. 83-91.

Chinese Office Action; corresponding CN Appln No. 201480071548.3, dated Apr. 23, 2018; 15 pages.

* cited by examiner

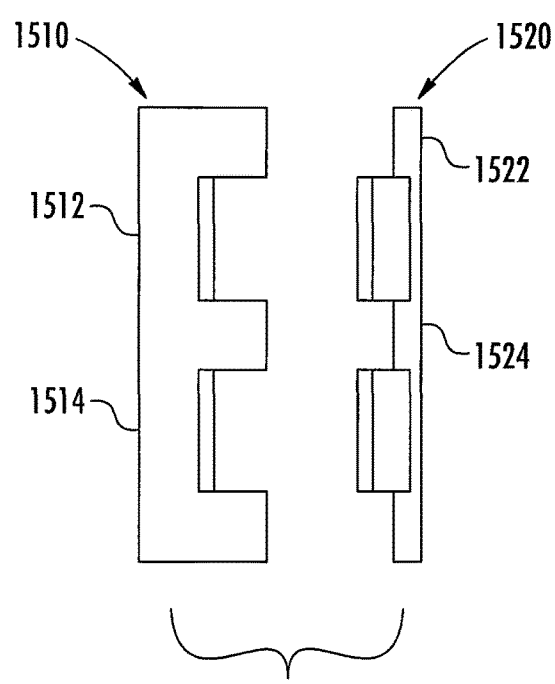
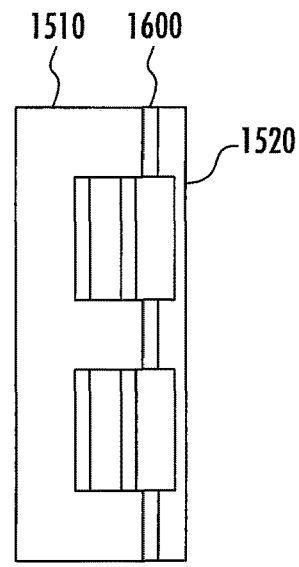
FIG. 15    FIG. 16
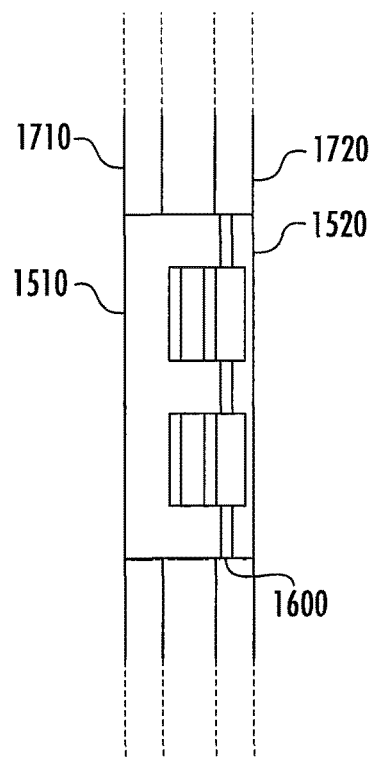
FIG. 17

WIRELESS POWER TRANSFER APPARATUS USING ENCLOSURES WITH ENHANCED MAGNETIC FEATURES AND METHODS OF FABRICATING THE SAME

RELATED APPLICATIONS

The present application is related to U.S. application Ser. No. 14/579,007, filed Dec. 22, 2014, entitled WIRELESS POWER TRANSFER APPARATUS AND POWER SUPPLIES INCLUDING OVERLAPPING MAGNETIC CORES and to U.S. application Ser. No. 14/143,505, filed Dec. 30, 2013, entitled METHODS, CIRCUITS AND ARTICLES OF MANUFACTURE FOR CONFIGURING DC OUTPUT FILTER CIRCUITS, the disclosures of which are hereby incorporated herein by reference in their entireties.

BACKGROUND

The inventive subject matter relates to power supply apparatus and methods, more particularly, to wireless power transfer apparatus and methods.

Wireless power transfer is used in a variety of different applications, including battery charging for portable electronic devices, such as cell phones and handheld appliance (e.g., electric shavers and toothbrushes), and for higher-power applications, such as vehicle charging. Wireless power transfer techniques have also been employed to provide power to computing devices, such as servers.

FIG. 1 illustrates a DC/DC converter arrangement commonly used in conventional wireless power transfer systems. The system includes a transmitter circuit 10 configured to be coupled to a DC power source. The transmitter circuit 10 is a converter circuit including transistors Q1, Q2 and an output network including a capacitor Cr and inductors Lr, Lp. The transmitter circuit 10 is coupled to a primary winding of a transformer 20. A receiver circuit 20 is coupled to a secondary winding of the transformer 20 and includes another converter circuit including a rectifier comprising diodes D1, D2, which develops an output voltage Vo across and output capacitor Cf. FIG. 2 illustrates a conventional split core arrangement used for the transformer 20, including first and second separable coil assemblies 20a, 20b, including E-shaped magnetic cores 22a, 22b having first and second windings 24a, 24b on middle legs thereof. When providing wireless power transfer, the coil assemblies 20a, 20b are brought in close proximity to facilitate flux transfer between the cores 22a, 22b. Generally, efficiency of power transfer is dependent upon a distance d between the cores 22a, 22b.

SUMMARY

Some embodiments of the inventive subject matter provide an apparatus including an enclosure and a coil assembly in the enclosure. The coil assembly includes a magnetic core and a coil disposed on the magnetic core. The magnetic core is positioned adjacent a wall of the enclosure such that a direction of a main flux path in the magnetic core is through at least one portion of the wall having a magnetic permeability greater than air.

In some embodiments, the at least one portion of the wall may include a region with a first magnetic permeability embedded in another wall component having a second magnetic permeability less than the first magnetic permeability. The magnetic core may be positioned adjacent the region such that the main flux path is directed through the region. For example, the region may include a plastic material formed in a space defined in the wall component.

In some embodiments, the magnetic core may include first and second legs positioned adjacent the wall such that first and second portions of the main flux path in respective ones of the first and second legs are directed through the at least one portion of the wall. The at least one portion of the wall may include first and second spaced apart regions and the first and second portions of the main flux path may be directed through respective ones of the first and second spaced apart regions. For example, the spaced apart first and second regions may include respective first and second regions with a first magnetic permeability embedded in another wall component having a second magnetic permeability less than the first magnetic permeability.

In some embodiments, the magnetic core may be E-shaped and include first, second and third parallel legs. The coil may be arranged on the second leg between the first and third legs. The coil assembly may be positioned adjacent the wall such that main flux paths in the legs are directed through at least one portion of the wall.

In some embodiments, the enclosure may be configured to be installed in an equipment rack, and the apparatus may further include a wireless power receiver circuit in the enclosure and configured to provide power to at least one load in the equipment rack.

Further embodiments provide a system including a wireless power transmitter device comprising a first enclosure, a first coil assembly in the first enclosure and comprising a first magnetic core and a first coil disposed on the first magnetic core. The first magnetic core is positioned adjacent a wall of the first enclosure. The system further includes a wireless power receiver device comprising a second enclosure, a second coil assembly in the second enclosure and comprising a second magnetic core and a second coil disposed on the second magnetic core. The second magnetic core is positioned adjacent a wall of the second enclosure. The wireless power transmitter device and the wireless power receiver device are disposed adjacent one another such that walls of the first and second enclosures are opposed and the first and second magnetic cores are aligned, and at least a portion of at least one of the walls of the first and second enclosures between the first and second magnetic cores has a magnetic permeability greater than air. For example, the at least a portion of at least one of the walls may include a region with a first magnetic permeability embedded in another wall component having a second magnetic permeability less than the first magnetic permeability. The region may include, for example, a plastic magnetic material formed in a space defined in the wall component.

Further embodiments provide a system including an equipment rack having at least one bus therein configured to provide power to at least one device installed in the equipment rack. The system further includes a wireless power receiver unit comprising an enclosure configured to be installed in the equipment rack, a converter circuit in the enclosure and having an output configured to provide power to the at least bus, and a coil assembly in the enclosure and comprising a magnetic core and a coil disposed on the magnetic core and coupled to an input of the converter circuit. The magnetic core is positioned adjacent the wall such that a direction of a main flux path in the magnetic core is through at least one portion of the wall having a magnetic permeability greater than air.

Additional embodiments provide methods including providing an enclosure having a coil assembly therein, the coil assembly comprising a magnetic core and a coil disposed on the magnetic core. The magnetic core is positioned adjacent a wall of the enclosure such that a direction of a main flux path in the magnetic core is through at least one portion of the wall. The methods further comprise creating a material region in the at least one portion of the wall having a relative magnetic permeability greater than air.

BRIEF DESCRIPTION OF THE DRAWINGS

FIG. 15 illustrates interlocking coil assemblies according to some embodiments.

FIG. 16 illustrates the coil assemblies of FIG. 15 arranged with a magnetically permeable material therebetween according to some embodiments.

FIG. 17 illustrates an enclosure arrangement for wireless power transfer using the coil assembly arrangement of FIG. 16.

DETAILED DESCRIPTION

Figure 1:
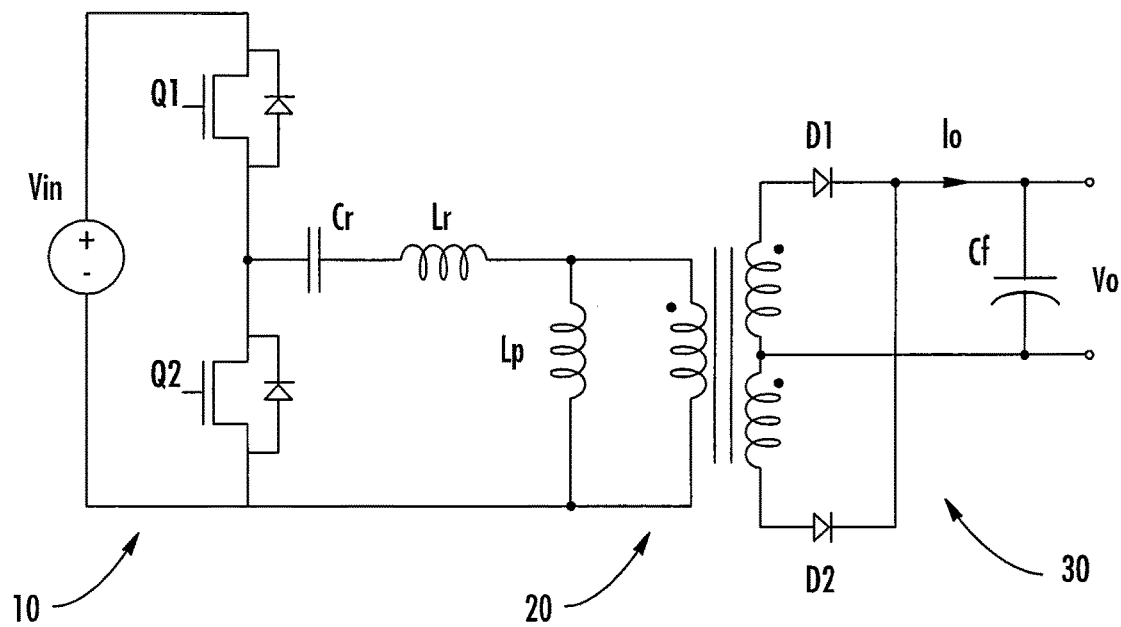
FIG. 1 is a schematic diagram illustrating a DC/DC converter arrangement for a conventional wireless power transfer system.
Figure 2:
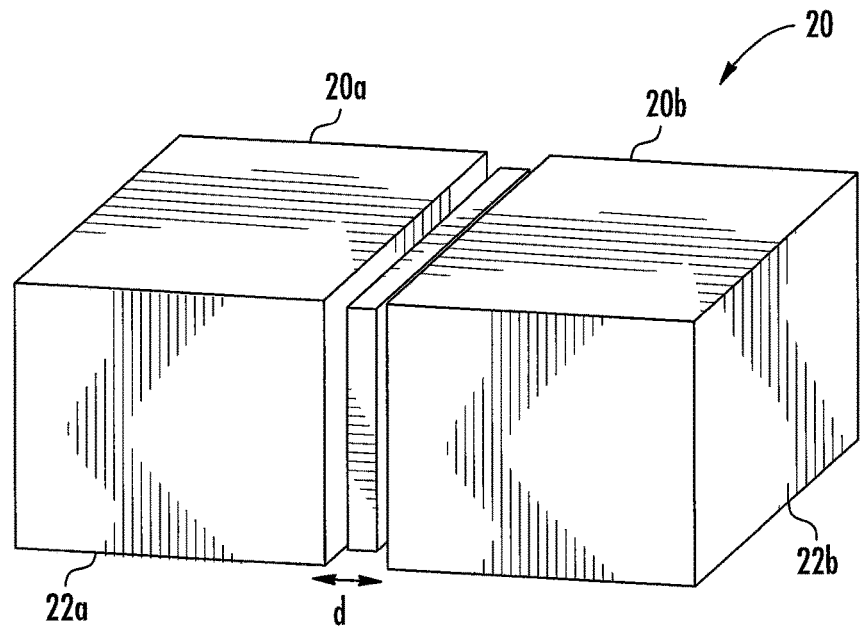
FIG. 2 illustrates a split core transformer arrangement for the DC/DC converter of FIG. 1.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that improved performance in wireless power transfer systems may be achieved by using enclosures that are constructed from magnetically permeable materials that facilitate flux linkage between transfer components. In some embodiments, for example, an enclosure may be constructed all or in part from a magnetically permeable material, such as a plastic impregnated with iron particles or other magnetically permeable materials (e.g. dielectromagnetic materials, ferromagnetic composite materials, and the like). In some embodiments, a wall or other component of an enclosure used for wireless power transfer may be constructed from such materials. In further embodiments, such a component may be formed in situ by, for example, installing a magnetically permeable material into the enclosure wall or molding a magnetically permeable material into the enclosure wall to provide an enhanced magnetic flux transmission region. In still further embodiments, such materials may be inserted, molded, or otherwise installed between wireless power transfer coil assemblies to provide flux path enhancement.

Figure 3:
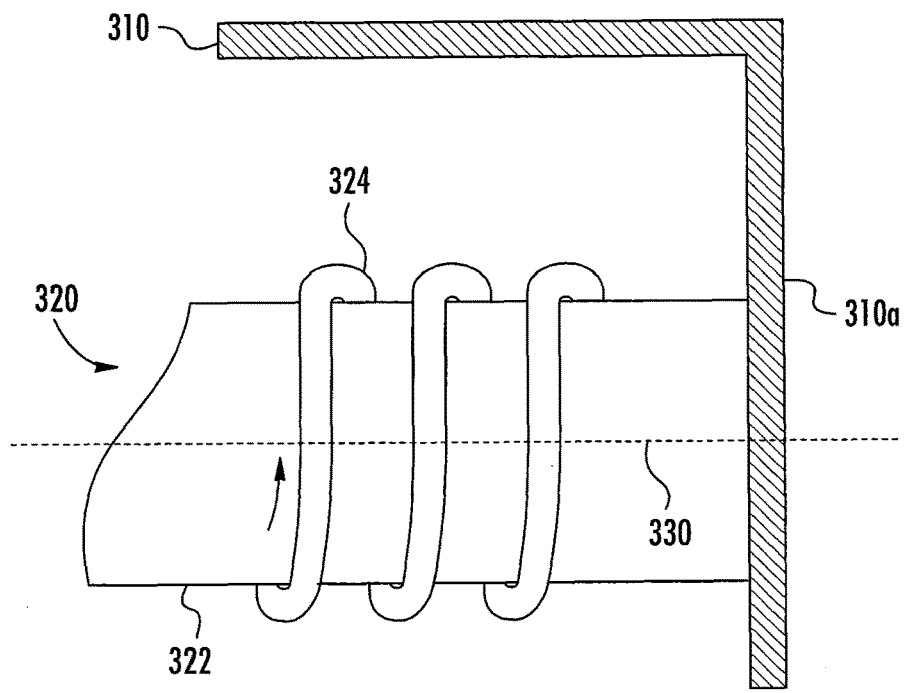
FIG. 3 illustrates components of a wireless power transfer system including a magnetically permeable enclosure according to some embodiments of the inventive subject matter.

FIG. 3 illustrates some components of a wireless power transfer system according to some embodiments. A coil assembly 320 includes a magnetic core 322 positioned adjacent a wall 310a of an enclosure 310. A coil 324 is positioned on the magnetic core 322. A main flux path 330 in the magnetic core 322 is associated with a current i in the coil 324 and is directed through the wall 310a. The main flux path 330 may be, for example, a main path of a flux induced by the current i produced when the coil 324 is driven by a wireless power transmitter circuit (e.g., an inverter). In some embodiments, the main flux path 330 may be of flux that induces the current i, with the flux being created by a current in a mating coil assembly (not shown) on an opposite side of the enclosure wall 310a.

As shown, the enclosure 310 may be constructed of a magnetically permeable material. For example, in some embodiments, substantially all of the enclosure 310 may be constructed from such a material. In other embodiments, only a portion of the enclosure 310, such as all or part of the wall 310a, may be constructed of such a material. In some embodiments illustrated in FIG. 4, a magnetically permeable material region 314 may be embedded in the wall 310a, and the magnetic core 322 of the coil assembly 320 may be positioned adjacent the magnetically permeable region 314.

In some embodiments, the magnetically permeable material has a magnetic permeability substantially greater than the magnetic permeability of air (or materials of similar permeability) to provide an enhanced flux path through the enclosure wall. Examples of materials that may be used to form a magnetically permeable enclosure and/or region within such an enclosure include, but are not limited to, soft iron, carbonyl iron, iron powder, silicon steel, ferrite ceramic, and vitreous metal. Such materials may be cast, machined, extruded, or otherwise formed and/or bound in a polymer (e.g., plastic) or other supporting matrix. As explained below, these materials may be used to form a component of an enclosure (e.g., a wall) and/or used to form inserts, plugs or other structures that may be embedded in a wall of an enclosure. For ease of explanation, such enhanced permeability materials may be referred to herein as "magnetically permeable."

Figure 4:
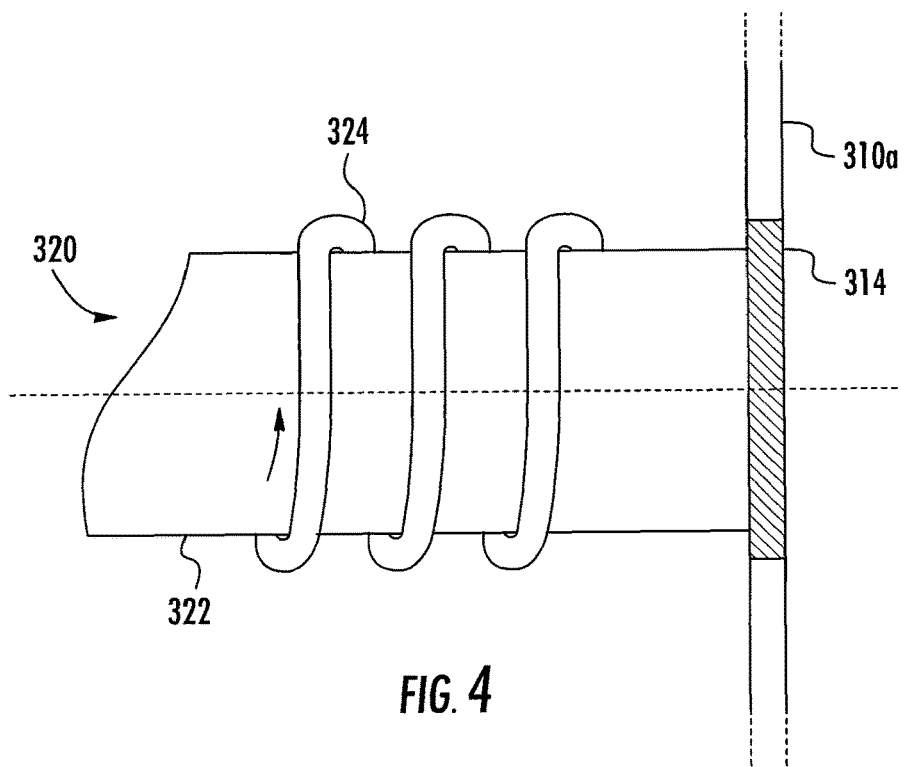
FIG. 4 illustrates components of a wireless power transfer system including an enclosure with a magnetically permeable region according to further embodiments of the inventive subject matter.
Figure 5:
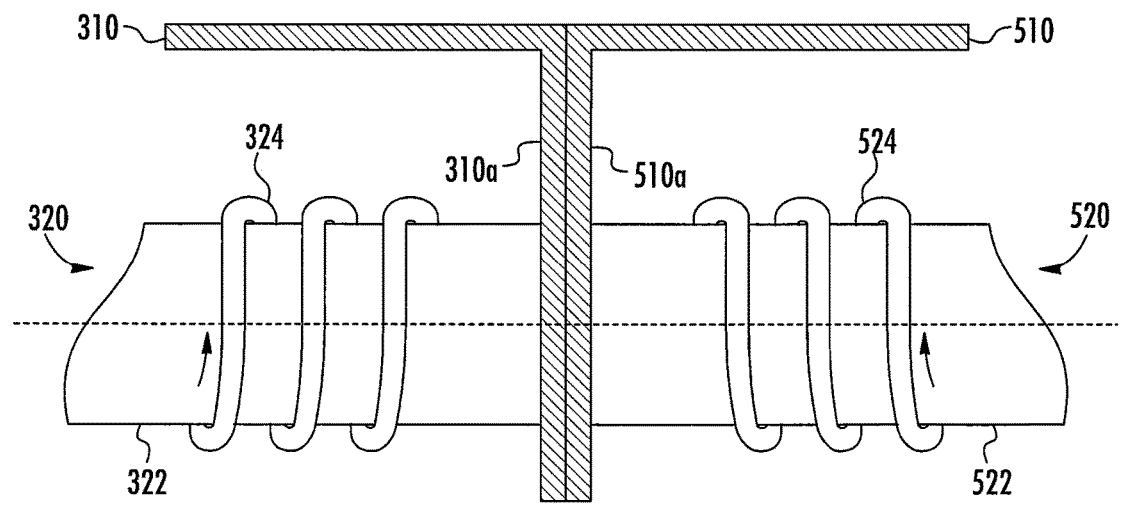
FIGS. 5 and 6 illustrate mating of inductive transfer components of wireless power transfer systems according some embodiments of the inventive subject matter.
Figure 6:
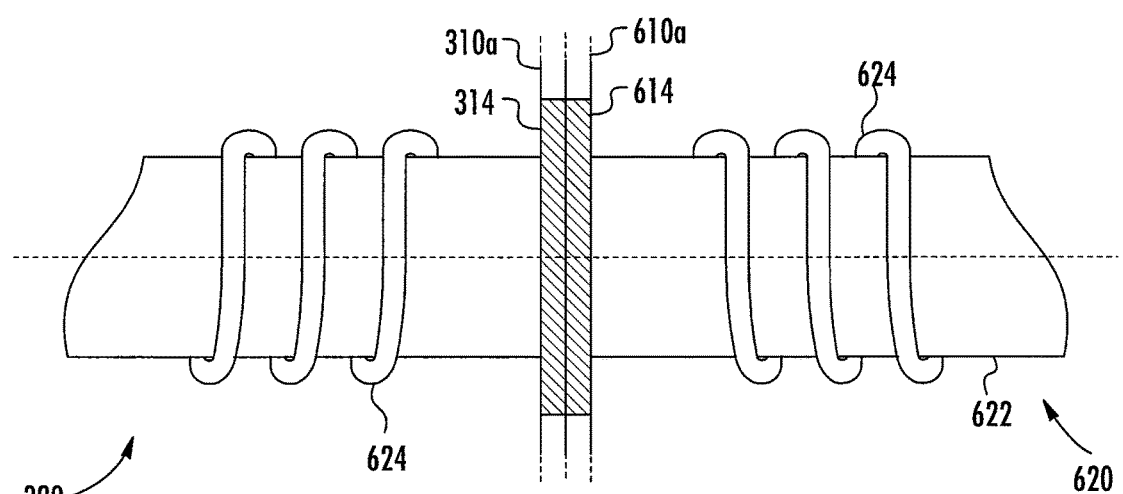

FIGS. 5 and 6 illustrate examples of wireless power transfer applications for the apparatus illustrated in FIGS. 3 and 4. FIG. 5 illustrates the enclosure 310 positioned adjacent a second enclosure 510 housing a coil apparatus 520 including a magnetic core 522 and coil 524, similar to the coil apparatus 320 of FIG. 3. The housings 310, 510 are arranged such that the magnetic cores 322, 522 of the respective coil assemblies 320, 520 are substantially aligned. Like the wall 310a of the enclosure 310, the confronting wall 510a of the enclosure 510a may be constructed from an enhanced magnetic permeability material to support a main flux path through the walls 310a, 310b. One of the coil assemblies 320, 520 may, for example, be coupled to a transmitter circuit, while the other of the coil assemblies may be coupled to a receiver circuit, such that wireless power transfer between the enclosures is provided. FIG. 6 shows a similar arrangement for the apparatus of FIG. 4. In particular, wireless power transfer is provided between first coil assembly 320 and a second coil assembly 620 (including a core 622 and coil 624) using magnetically permeable regions 314, 614 embedded in walls 310a, 610a of respective enclosures. It will be understood that other arrangements may be used, e.g., a unit with an enclosure having a magnetically permeable wall as illustrated in FIG. 3 may be mated with a unit having an enclosure with a magnetically permeable insert or other embedded region as shown in FIG. 4.

Figure 7:
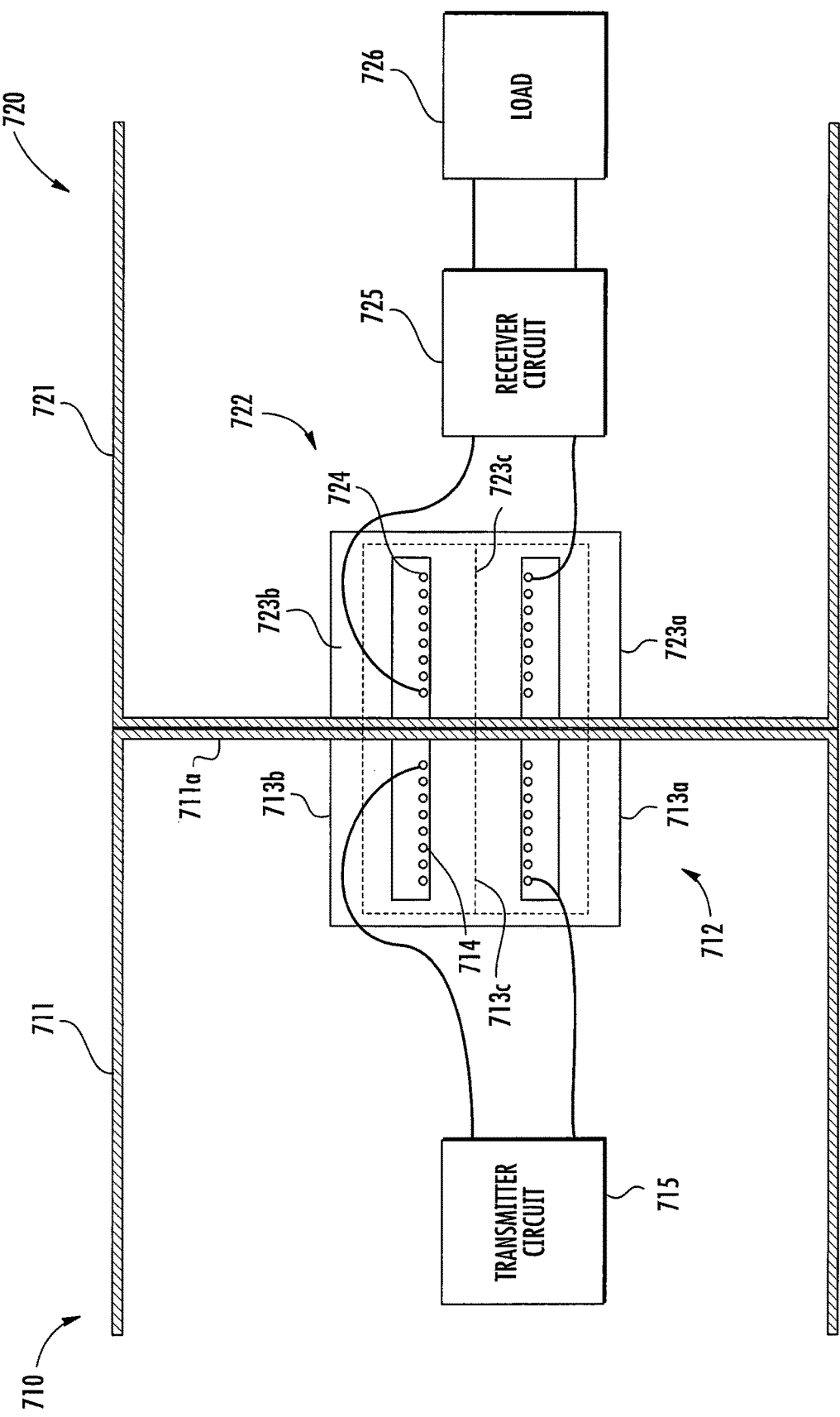
FIGS. 7 and 8 illustrate wireless power transfer systems using E-shaped split transformer arrangements with magnetically permeable enclosure components according to some embodiments of the inventive subject matter.

According to some embodiments, an enclosure with enhanced magnetic permeability may be advantageously used in a wireless power transfer system with an EE-type split transformer arrangement. Referring to FIG. 7, a first device 710 is configured to wirelessly provide power to a second device 720. The first device 710 includes an enclosure 711 comprising at least one wall 711a formed of a material having a magnetic permeability greater than the magnetic permeability of air (or materials with comparable permeability, such as plastic or aluminum). A coil assembly 712 includes an E-shaped magnetic core 713 including first, second and third legs 713a, 713b, 713c. A coil 714 is arranged around the center leg 713c. The coil assembly 712 is positioned adjacent the wall 711a of the enclosure 711 such that ends of the legs 713a, 713b, 713c abut the wall 711a. A transmitter circuit 715 is electrically coupled to the coil 714 and is configured to generate a current through the coil 714. The transmitter circuit 715 may, for example, have a converter circuit topology the same as or similar to that of the transmitter circuit 10 of FIG. 1. It will be appreciated, however, that the transmitter circuit 715 may take any of a number of other forms. It will be appreciated that, in some embodiments, the transmitter circuit 715 may be contained by the enclosure 711 or may be located external to the enclosure 711.

The second device 720 includes an enclosure 721 comprising at least one wall 721a formed of a material having a magnetic permeability greater than the magnetic permeability of air (e.g., the same material used in the first enclosure 711 a material with similar properties). A second coil assembly 722 includes an E-shaped magnetic core 723 including first, second and third legs 733a, 733b, 733c. A coil 724 is arranged around the center leg 723c. The coil assembly 722 is positioned adjacent the wall 721a of the enclosure 721 such that ends of the legs 723a, 723b, 723c abut the wall 721a and are aligned with the legs 713a, 713b, 713c of the first coil assembly 712. A receiver circuit 725 is coupled to the second coil 724, and provides power received via the coil 724 to a load 726. The receiver circuit 725 may, for example, have a converter circuit topology the same as or similar to that of the receiver circuit 20 of FIG. 1. It will be appreciated, however, that the receiver circuit 725 may take any of a number of other forms. It will be appreciated that, in some embodiments, the receiver circuit 725 may be contained by the enclosure 721 or may be located external to the enclosure 721. It will be further understood that the load 726 may be contained in the enclosure 721 or externally located.

Figure 8:
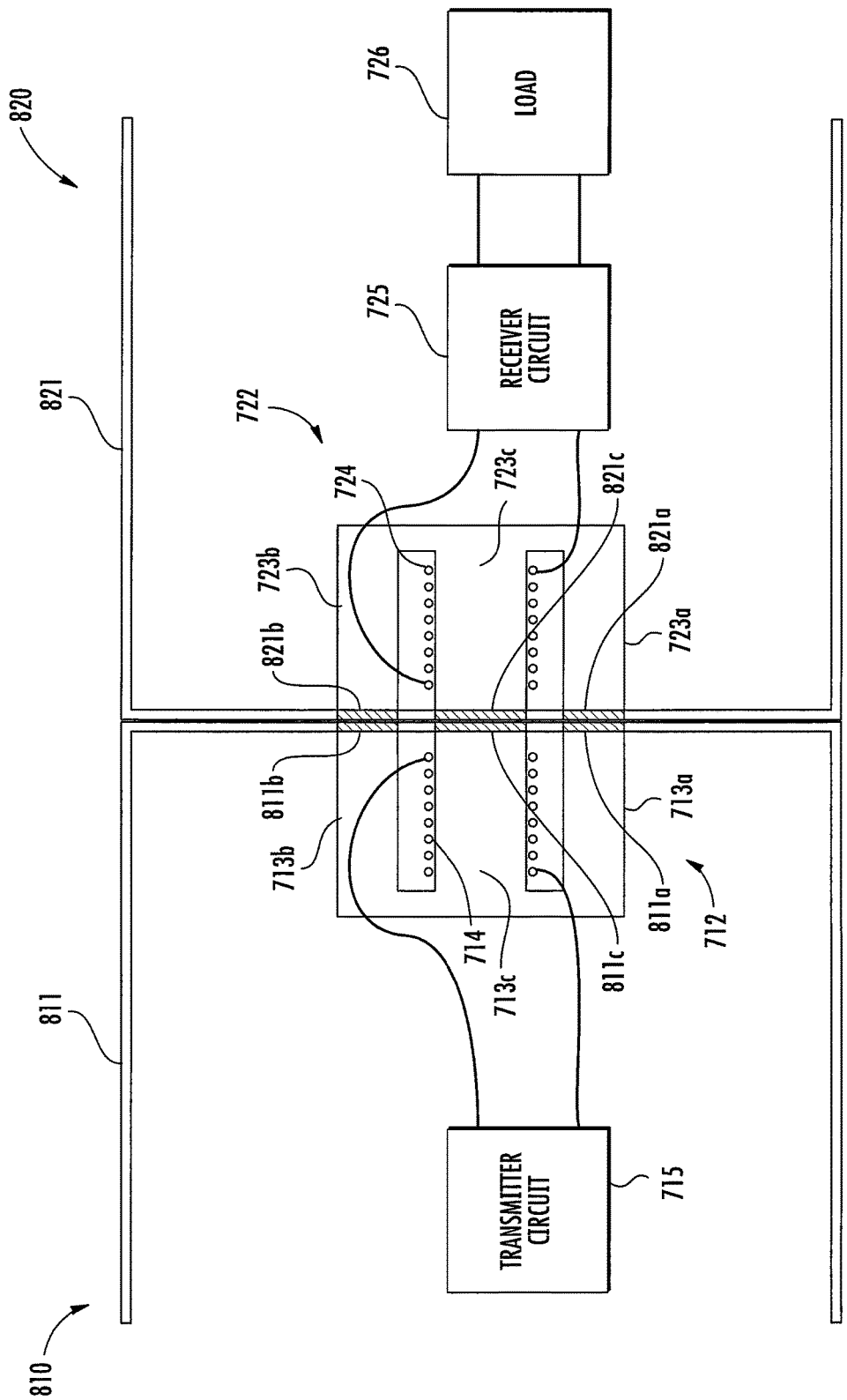

FIG. 8 illustrates a similar arrangement of first and second devices 810, 820, except that coil assemblies 712, 722 are housed in respective enclosures 811, 821 that have enhanced magnetic permeability regions embedded in opposing walls 811a, 821 between the coil assemblies 712, 722. In particular, the enclosure 811 includes first, second and third enhanced permeability regions 811b, 811c, 811d and the second enclosure 821 includes first, second, and third enhanced permeability regions 821b, 821c, 821d interposed between opposing legs 713a, 713b, 713c, 721a, 721b, 721c of the cores of the coil assemblies 712, 722. The rest of the enclosure walls, such as intervening regions in the enclosure walls separating the enhanced permeability regions 811b, 811c, 811d, 821b, 821c, 821d, may be formed of a less permeable material, which may reduce flux leakage through adjacent portions of the walls of the enclosures 811, 821.

Figure 9:
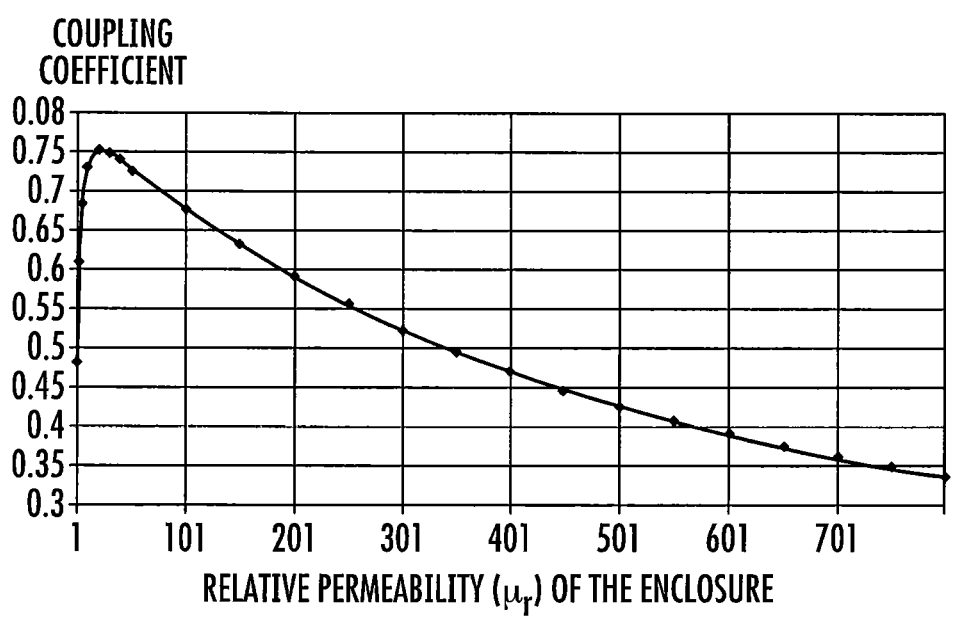
FIG. 9 illustrates simulated coupling performance of a wireless power transmission system for a range of enclosure permeability.

FIG. 9 illustrates a graph of simulated coupling coefficient performance as function of enclosure relative permeability for a system using an enclosure wall with enhanced permeability along the lines illustrated in FIG. 7. As can be seen, coupling improves as the relatively permeability of the enclosure increases above 1 to about 20, peaking at a value of about 0.75. As the permeability of the enclosure increases, however, the coupling coefficient begins to decline, falling below the coupling coefficient for an air gap when the permeability of the enclosure reaches about 400. It is believe that this degradation in coupling with further increased permeability may be caused by increased flux leakage through portions of the wall of the enclosure lateral to the main flux path. Such flux leakage may be reduced in embodiments along the lines illustrated in FIG. 8, due to the presence of relatively low permeability material between the enhanced permeability regions 811a, 811b, 811c, 821a, 821b, 821c.

Enhanced-permeability regions for enclosure walls along the lines discussed above may be formed in any of a number of different ways. For example, such regions may take the form of plugs, inserts, plates, molded regions, and the like embedded in enclosure walls. Such regions may be formed from a variety of materials, including, but not limited to, soft iron, carbonyl iron, iron powder, silicon steel, ferrite ceramic, and vitreous metal. Such materials may include dielectromagnetic materials, such as ferromagnetic composite materials described, for example, in Pang, Y. X. et al. (2007) "The influence of the dielectric on the properties of dielectromagnetic soft magnetic composites. Investigations with silica and silica hybrid sol-gel derived model dielectric", *Journal of Magnetism and Magnetic Materials,* 310 (1), pp. 83-91 (2007). Such materials may be cast, machined, molded, or otherwise formed.

Figure 10A:
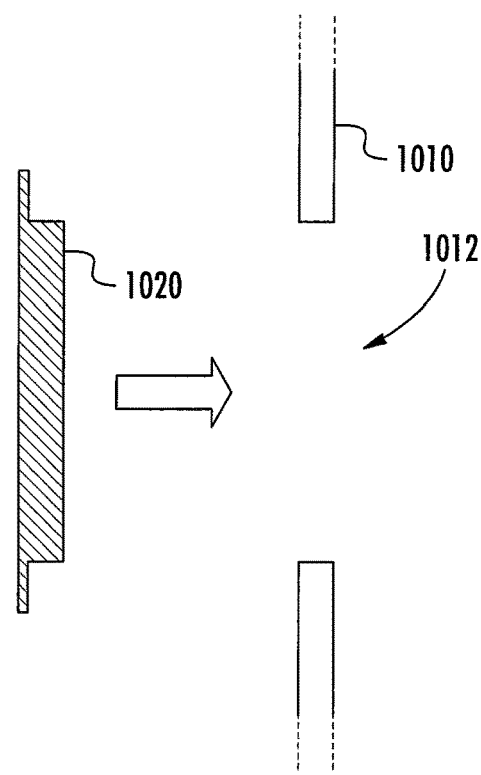
FIGS. 10A and 10B illustrate an enclosure arrangement using a magnetically permeable insert according to some embodiments of the inventive subject matter.
Figure 10B:
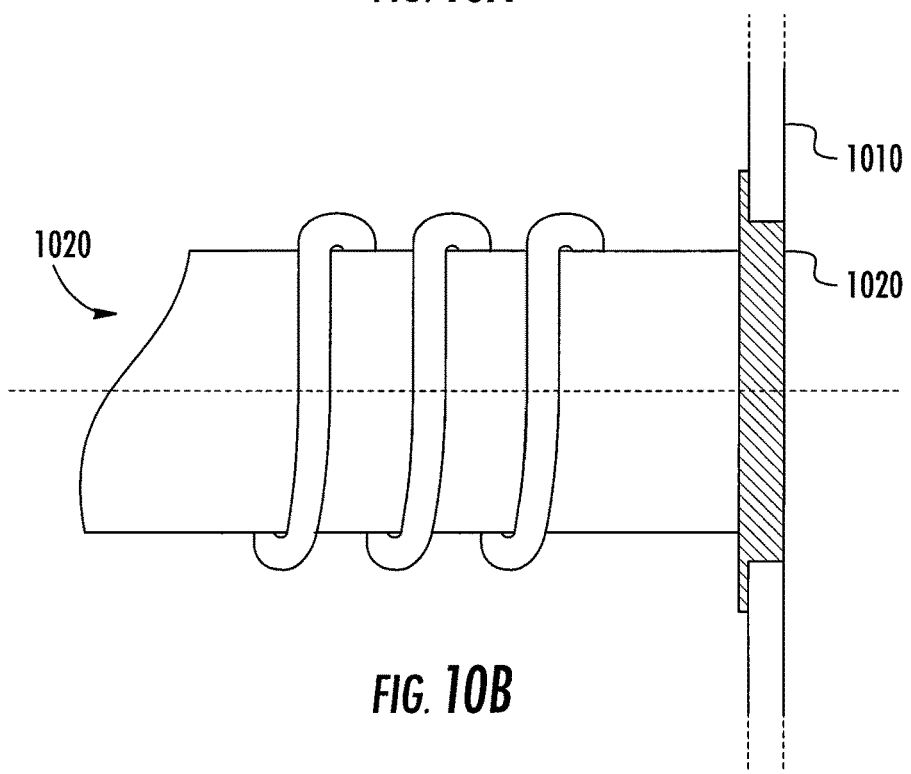

FIGS. 10A and 10B illustrate an example of such a region, in particular, an enhanced-permeability insert 1020 that is configured to be installed in an opening, recess or other similar feature in an enclosure wall 1010. As shown, the insert 1020 may be installed prior to placement of a wireless power transfer coil assembly 1030. The insert 1020 may be held in place using, for example, retaining hardware (e.g., clip, clamp or the like), adhesives, or other fastening techniques and/or may be held in place by hardware that holds the coil assembly 1030 against the enclosure wall 1010.

Figure 11A:
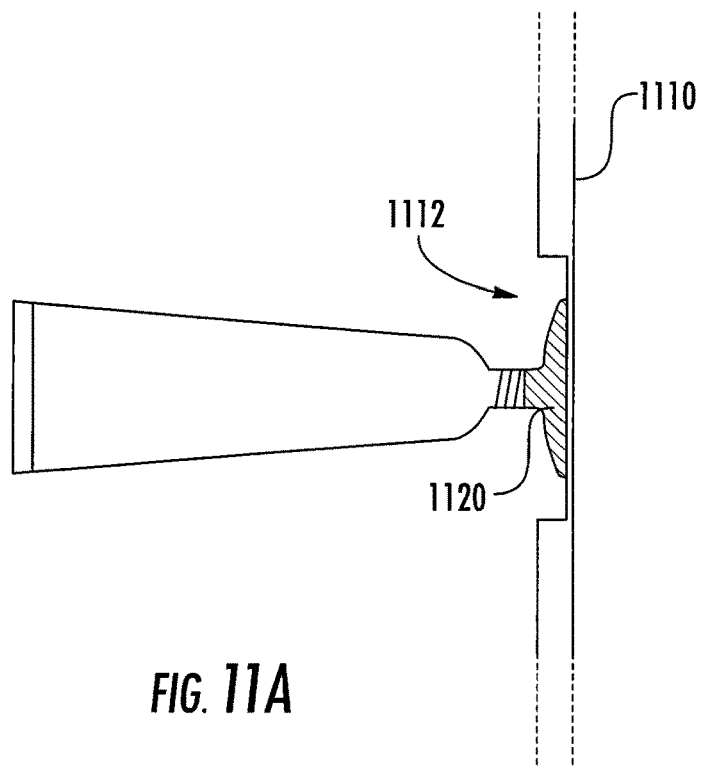
FIGS. 11A and 11B illustrate an enclosure arrangement illustrating use of an in situ molded magnetically permeable region according to further embodiments of the inventive subject matter.
Figure 11B:
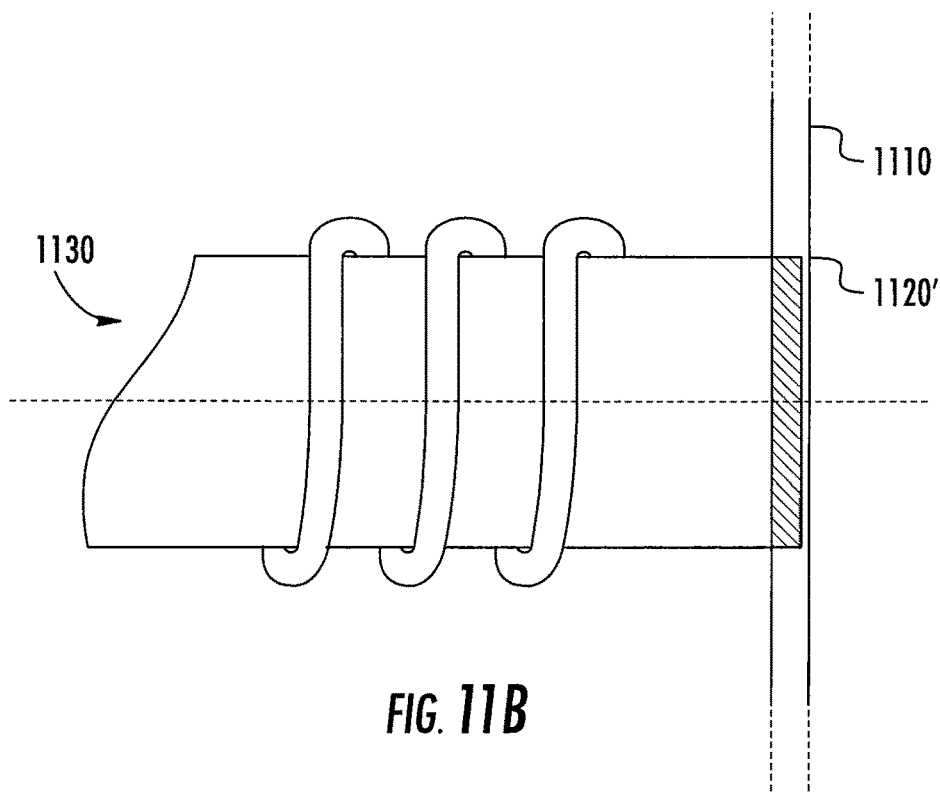

According to further embodiments, an enhanced-permeability region may be formed in situ using a moldable enhanced-permeability material, such as plastic resin or similar material containing magnetic particles, such as iron powder. As shown in FIGS. 11A and 11B, such a material 1120 may be deposited in a recess 1112 or similar feature in an enclosure wall 1110. The material 1120 may, for example, be manually distributed or pressed into place by a coil assembly 1130 to form an enhanced permeability region 1120' in the enclosure wall 1110.

Figure 12:
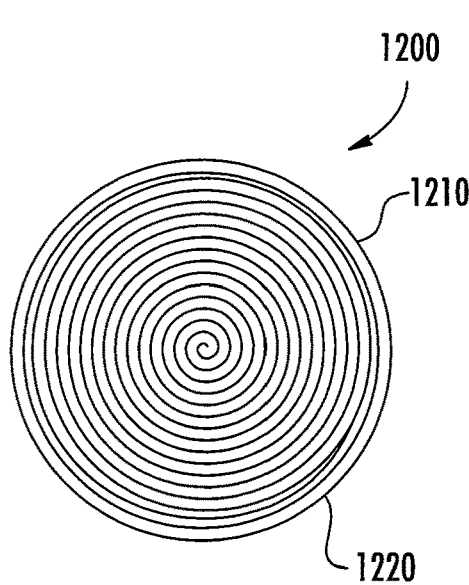
FIG. 12 illustrates a coil assembly according to some embodiments.
Figure 13:
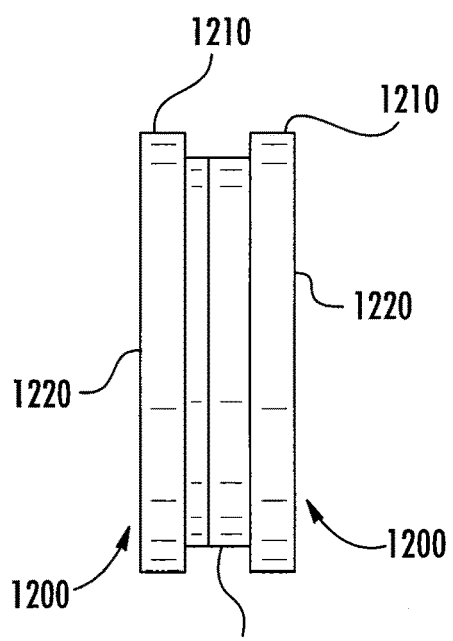
FIG. 13 illustrates two of the coil assemblies of FIG. 12 arranged with a magnetically permeable material therebetween according to some embodiments.
Figure 14:
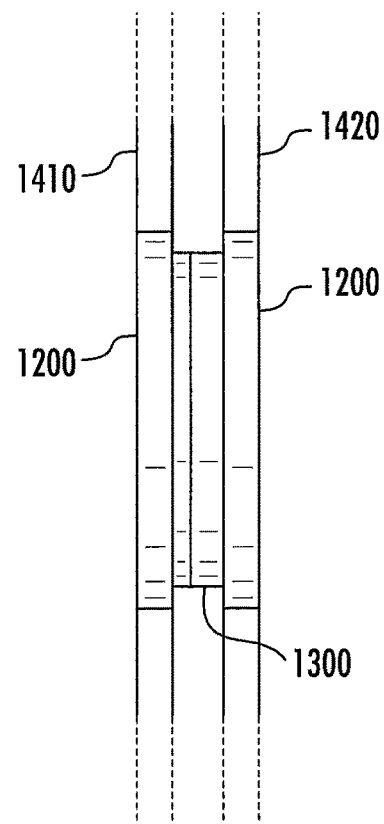
FIG. 14 illustrates an enclosure arrangement for wireless power transfer using the coil arrangement of FIG. 13.

Still further embodiments may employ such a material in other arrangements. Referring to FIG. 12, a coil assembly 1200 may include a coil 1220 arranged on a magnetic (e.g., ferrite) core 1210. As shown in FIG. 13, two such coil assemblies 1200 may be arranged in an opposed adjacent relationship. Flux linkage between the cores 1210 may be enhanced by providing a magnetically permeable material 1300, such as the dielectromagnetic composite materials described above, between the coil assemblies 1200. As shown in FIG. 14, such an arrangement may be used for wireless power transfer between first and second devices having respective enclosure walls 1410, 1420. The magnetically permeable material 1300 may be, for example, a dielectromagnetic composite resin or gel that is applied in a factory on at an installation site. In some embodiments, the magnetically permeable material 1300 may be a preformed sheet, disc, gasket or similar structure attached to one of the device and/or inserted between the coil assemblies 1200 during assembly or installation.

FIGS. 15-17 illustrate a similar use for a structure including interlocking coil assemblies 1510, 1520. The coil assemblies 1510, 1520 include interlocking cores 1512, 5122 having respective coils 1514, 1524 arranged thereon. A magnetically permeable material 1600 along the lines discussed above may be placed or formed between the mated coil assemblies 1510, 1520. As shown in FIG. 17, such an arrangement may be used for wireless power transfer between devices having respective enclosure walls 1710, 1720.

Figure 18:
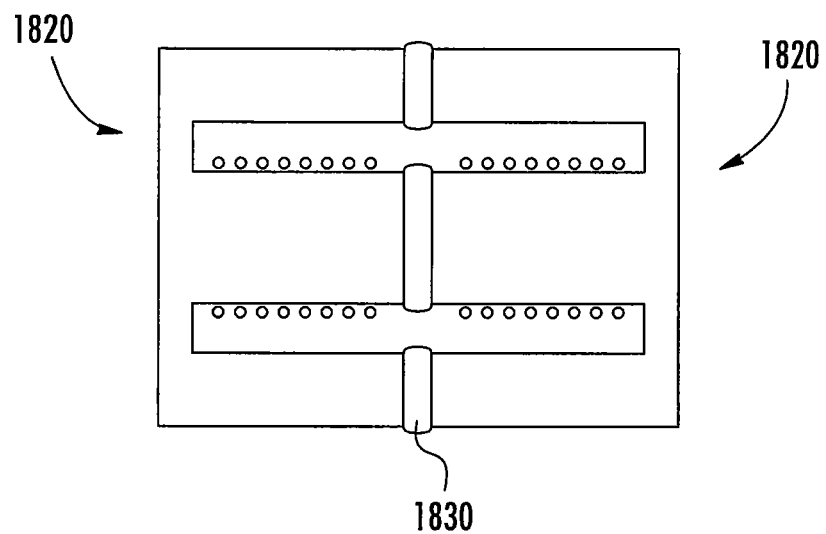
FIG. 18 illustrates two E-type coil assemblies arranged with a magnetically permeable material therebetween according to some embodiments.
Figure 19:
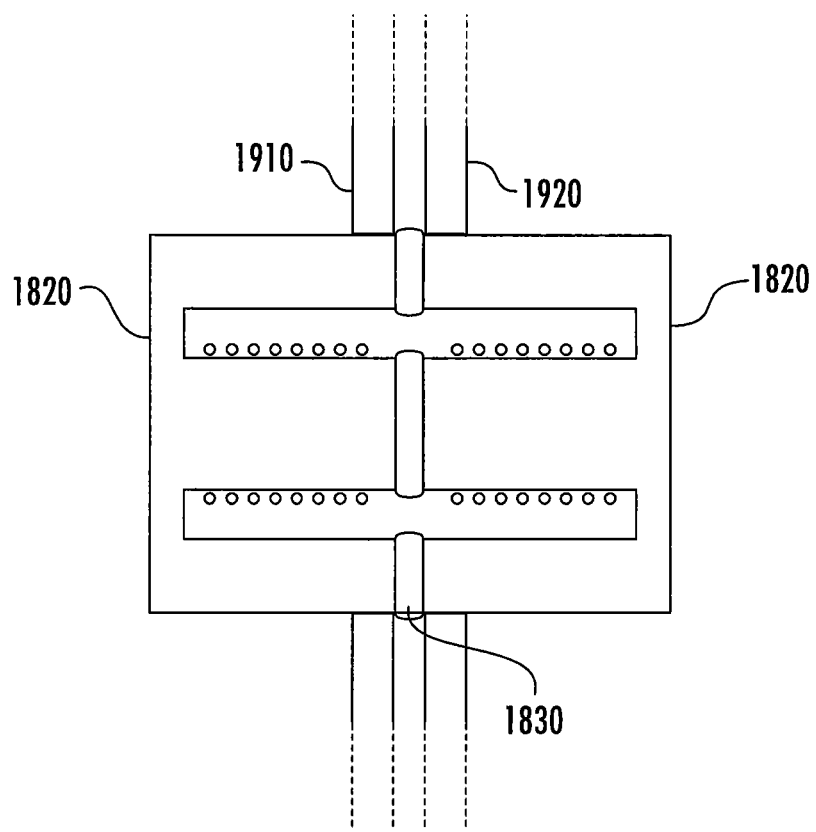
FIGS. 19-21 illustrate various enclosure arrangements for wireless power transfer using various arrangements of E-type coils and magnetically permeable enclosures and intervening material regions according to some embodiments.
Figure 20:
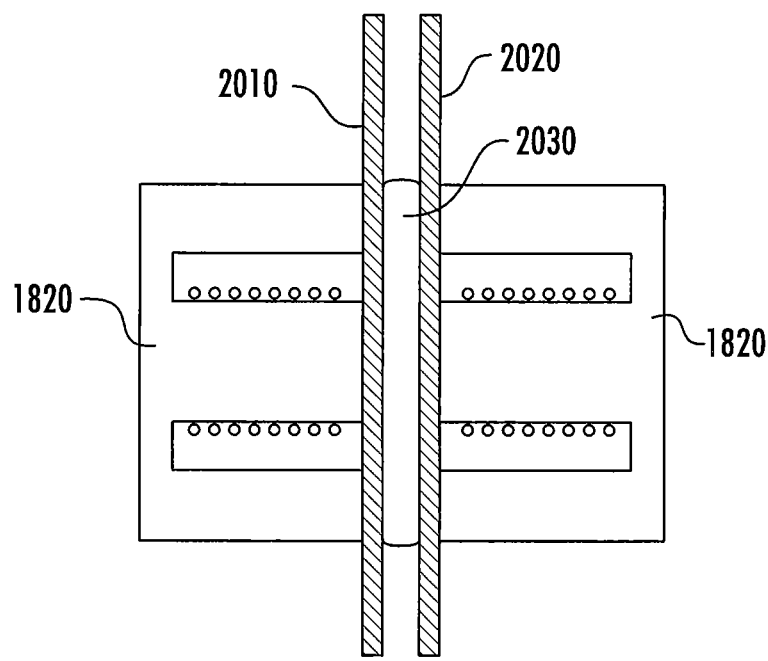
Figure 21:
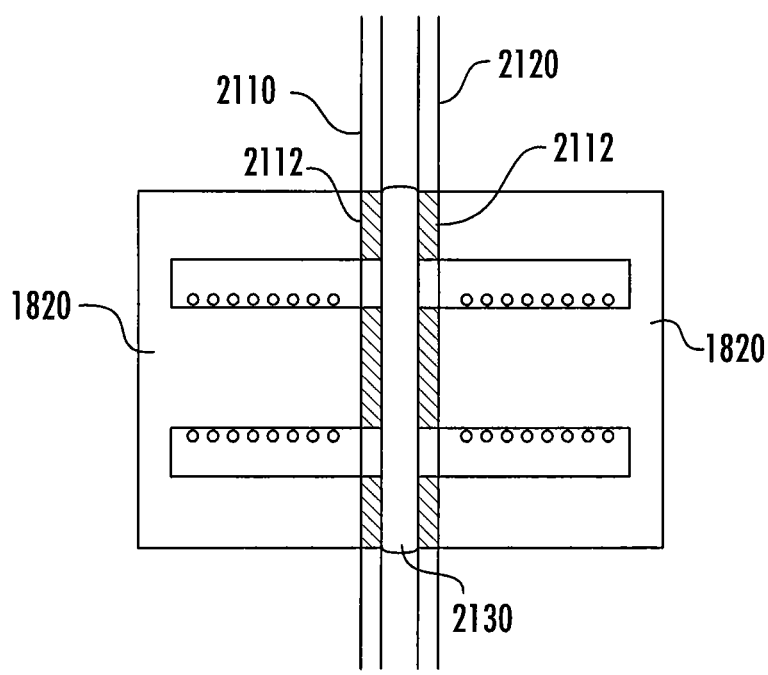

A flexible or formable flux linking material may also be used to improve flux linkage between the EE-type coil assemblies discussed above with reference to FIGS. 7 and 8. Referring to FIG. 18, first and second E-shaped coil assemblies 1820 may be joined by magnetic material regions 1830, which may be fabricated from a formable dielectromagnetic material during factory fabrication or site installation. As shown in FIG. 19, such an arrangement may be used for wireless power transfer between first and second devices having respective enclosures 1910, 1920. As shown in FIGS. 20 and 21, magnetic coil assemblies 1820 may be arranged in enclosures having magnetically permeable walls 2010, 2020 or walls 2110, 2120 having magnetically permeable regions 2112, 2122 embedded therein. A magnetically permeable material 2030, 2130 may be inserted or formed between the walls 2010, 2020, 2110, 2120 at the location of the coil assemblies 1820. The magnetically permeable material 2030, 2130 may be inserted or formed when the devices are fabricated and/or may be installed when the devices are installed.

Figure 22:
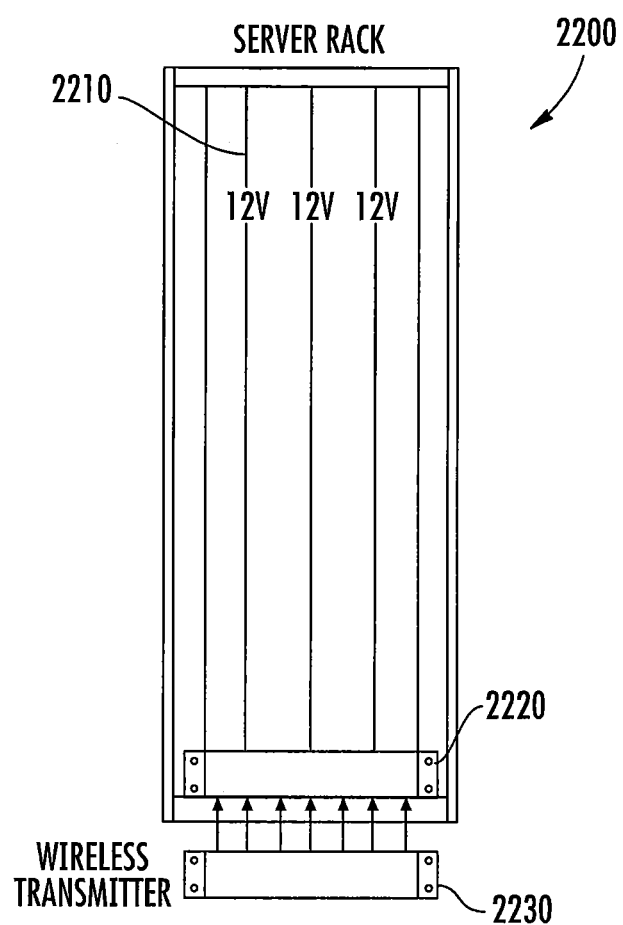
FIG. 22 illustrates a wireless power transfer system for a server rack according to further embodiments of the inventive subject matter.
Figure 23:
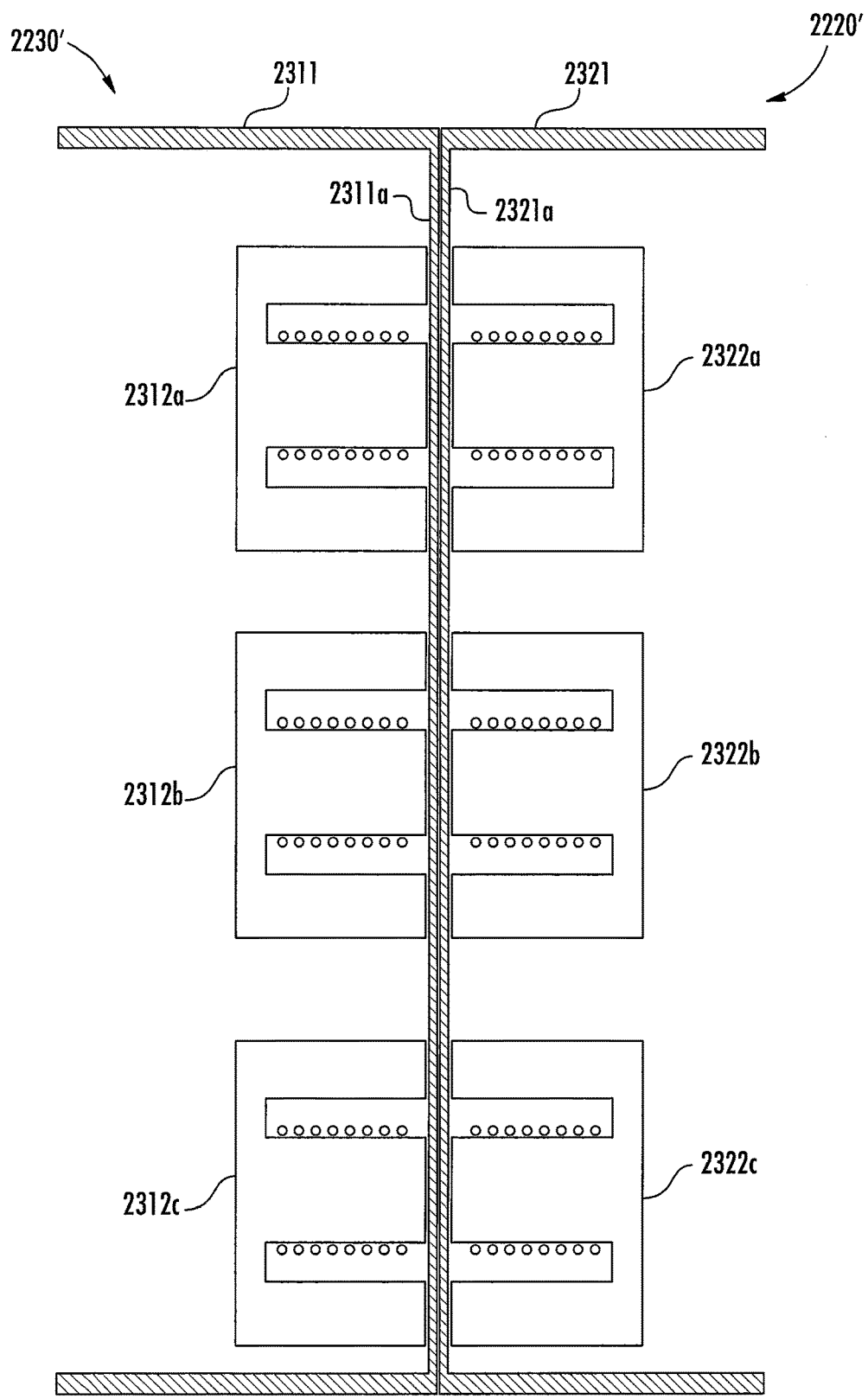
FIG. 23 illustrates a multiple split transformer arrangement that may be used for the wireless power transfer system of FIG. 22.

The flux enhancement structures described above may be used in a variety of different applications. For example, FIG. 22 illustrates a server rack architecture wherein a server rack 2200 includes a wireless power receiver unit 2220 that provides 12 volt power to buses that run vertically in the rack 2200. A wireless power transmitter unit 2230 is configured to mate with the receiver unit 2220. Enclosures of the transmitter unit 2230 and the receiver unit 2220 may contain complementary coil assemblies along lines discussed above, and the enclosures may incorporate magnetically permeable wall features (e.g., magnetically permeable walls, walls with magnetically permeable subregions, inserts or the like) as described above. For example, as shown in FIG. 23, a transmitter unit 2230' may include an enclosure 2311 having multiple coil assemblies 2312a, 2312b, 2312c positioned or otherwise positioned adjacent a wall 2311a formed of a magnetically permeable material and, similarly, a receiver unit 2220' may include an enclosure 2321 having multiple coil assemblies 2322a, 2322b, 2322c positioned adjacent a wall 2321a formed of a similar magnetically permeable material. The multiple coil assemblies may be used to provide a desired power transfer capacity, e.g., the coils may be coupled to paralleled receiver and/or transmitter circuits to provide a desired capacity.

Figure 24:
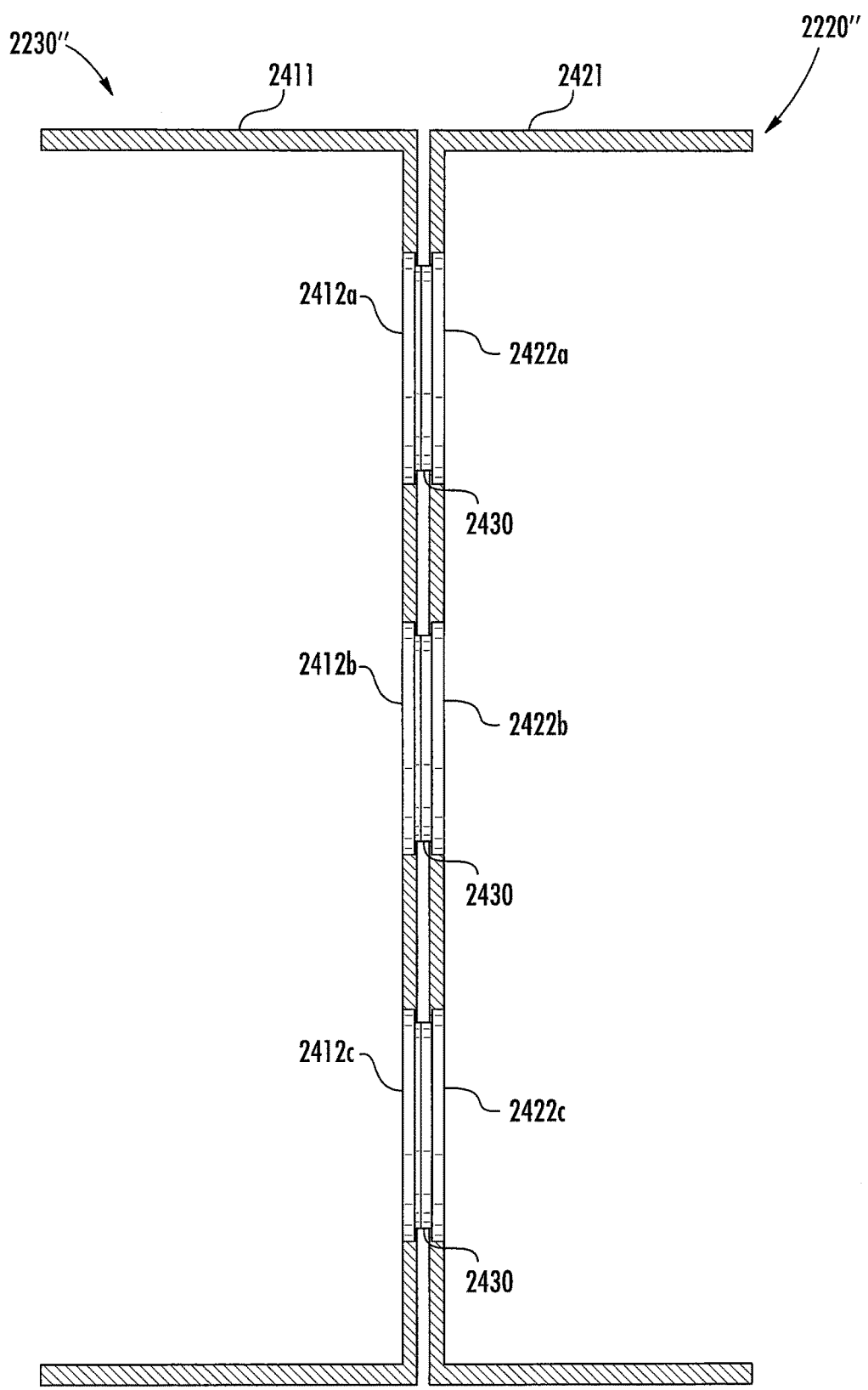
FIG. 24 illustrates another coil arrangement that may be used for the wireless power transfer system of FIG. 22.

Some embodiments may also use formable magnetically permeable material along the lines discussed above with reference to FIGS. 12-21. For example, FIG. 24 shows a transmitter unit 2230" including an enclosure 2411 containing multiple coil assemblies 2412a, 2412b, 2412c positioned at a wall of the enclosure 2411. A receiver unit 2220" includes an enclosure 2421 containing multiple coil assemblies 2422a, 2422b, 2422c positioned at a wall of the enclosure 2321. Magnetically permeable material regions 2430, e.g., regions formed from formable dielectromagnetic materials, may be disposed between the coil assemblies 2412a, 2412b, 2412c, 2422a, 2422b, 2422c to concentrate flux therebetween. It will be appreciated that the arrangements shown in FIGS. 23 and 24 are provide for purposes of illustrations, and that a wide variety of other arrangements of coil assemblies and magnetically permeable features may be used in other embodiments.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
   an enclosure configured to be installed in an equipment rack and comprising a wall;
   a coil assembly in the enclosure and comprising a magnetic core and a coil disposed on the magnetic core, the magnetic core positioned adjacent the wall such that a main flux path in the magnetic core is through at least one portion of the wall having a magnetic permeability greater than air, wherein the at least one portion of the wall comprises a region with a first magnetic permeability embedded in another component of the wall having a second magnetic permeability, and wherein the magnetic core is positioned adjacent the region such that the main flux path is directed through the region; and
   a wireless power receiver circuit in the enclosure, coupled to the coil and configured to be connected to at least one power bus in the equipment rack.

2. The apparatus of claim 1, wherein the at least one portion of the wall has a relative magnetic permeability greater than 1 and less than about 300.

3. The apparatus of claim 1, wherein the at least one portion of the wall comprises a plastic material having a magnetic material embedded therein.

4. The apparatus of claim 1, wherein the region comprises a plastic material formed in a space defined in the wall component.

5. The apparatus of claim 1, wherein the magnetic core comprises first and second legs positioned adjacent the wall such that first and second portions of the main flux path in respective ones of the first and second legs are directed through the at least one portion of the wall.

6. The apparatus of claim 5, wherein the at least one portion of the wall comprises first and second spaced apart regions and wherein the first and second portions of the main flux path are directed through respective ones of the first and second spaced apart regions.

7. The apparatus of claim 6, wherein the spaced apart first and second regions comprise respective first and second regions with a first magnetic permeability embedded in another wall component having a second magnetic permeability less than the first magnetic permeability.

8. The apparatus of claim 1, wherein the magnetic core is E-shaped and comprises first, second and third parallel legs, wherein the coil is arranged on the second leg between the first and third legs, wherein the coil assembly is positioned adjacent the wall such that main flux paths in the legs associated with the current through the coil are directed through at least one portion of the wall.

9. A system comprising:
   a wireless power transmitter device comprising a first enclosure, a first coil assembly in the first enclosure and comprising a first magnetic core and a first coil disposed on the first magnetic core, the first magnetic core positioned adjacent a wall of the first enclosure;
   a wireless power receiver device comprising a second enclosure, a second coil assembly in the second enclosure and comprising a second magnetic core and a second coil disposed on the second magnetic core, the second magnetic core positioned adjacent a wall of the second enclosure,
   wherein the wireless power transmitter device and the wireless power receiver device are disposed adjacent one another such that walls of the first and second enclosures are opposed and the first and second magnetic cores are aligned, and wherein respective first and second opposing portions of the walls of the first and second enclosures between the first and second magnetic cores have a magnetic permeability greater than air; and
   a magnetically permeable material deposited between the first and second portions of the first and second walls.

10. The system of claim 9, wherein the first and second portions of the first and second walls have a relative magnetic permeability greater than 1 and less than about 300.

11. The system of claim 9, wherein the first and second portions of the first and second walls comprise a plastic material having a magnetic material embedded therein.

12. The system of claim 9, at least one of the first and second portions of the first and second walls comprises a region with a first magnetic permeability embedded in another wall component having a second magnetic permeability.

13. The system of claim 12, wherein the region comprises a plastic magnetic material formed in a space defined in the wall component.

14. A system comprising:
   an equipment rack having at least one bus therein configured to provide power to at least one device installed in the equipment rack; and
   a wireless power receiver unit comprising an enclosure installed in the equipment rack, a converter circuit in the enclosure and having an output coupled to the at least one bus, and a coil assembly in the enclosure and comprising a magnetic core and a coil disposed on the magnetic core and coupled to an input of the converter circuit, the magnetic core positioned adjacent a wall of the enclosure such that a direction of a main flux path in the magnetic core is through at least one portion of the wall having a magnetic permeability greater than air, wherein the at least one portion of the wall comprises a plastic material having a magnetic material in the wall therein.

15. The system of claim 14, wherein the at least one portion of the wall has a relative magnetic permeability greater than 1 and less than about 300.

16. The system of claim 14, wherein the at least one portion of the wall comprises a region with a first magnetic permeability embedded in another wall component having a second magnetic permeability, and wherein the magnetic core is positioned adjacent the region such that the main flux path is directed through the region.

17. The system of claim 16, wherein the region comprises a plastic magnetic material formed in a space defined in the wall component.

18. The system of claim 14, further comprising a wireless power transmitter unit positioned adjacent the wall of the enclosure of the wireless power receiver unit and configured to wirelessly transfer power to the wireless power receiver unit.

19. The system of claim 18, wherein the enclosure comprises a first enclosure, wherein the wireless power transmitter unit comprises a second enclosure, and further comprising a magnetically permeable material region disposed between first and second walls of first and second enclosures.

20. A method comprising:
provinding an enclosure having a coil assembly therein, the coil assembly comprising a magnetic core and a coil disposed on the magnetic core, the magnetic core positioned adjacent a wall of the enclosure such that a direction of a main flux path in the magnetic core is through at least one portion of the wall; and
creating a material region in the at least one portion of the wall having a relative magnetic permeability greater than air by depositing a flowable magnetically permeable material in a recess in the wall.

21. The method of claim 20, wherein the flowable magnetically permeable material comprises a flowable plastic material having a magnetic material embedded therein.

22. The method of claim 21, wherein the embedded magnetic material comprises an iron powder.

* * * * *